(12) United States Patent
Silverstein et al.

(10) Patent No.: US 9,049,396 B2
(45) Date of Patent: Jun. 2, 2015

(54) CREATING COMPOSITE IMAGES BASED ON IMAGE CAPTURE DEVICE POSES CORRESPONDING TO CAPTURED IMAGES

(75) Inventors: D. Amnon Silverstein, Mountain View, CA (US); Yining Deng, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1636 days.

(21) Appl. No.: 10/954,112

(22) Filed: Sep. 29, 2004

(65) Prior Publication Data

US 2006/0072176 A1 Apr. 6, 2006

(51) Int. Cl.
*H04N 1/46* (2006.01)
*H04N 1/387* (2006.01)
*G06T 3/00* (2006.01)
*G06T 3/40* (2006.01)

(52) U.S. Cl.
CPC .............. *H04N 1/3876* (2013.01); *G06T 3/005* (2013.01); *G06T 3/4038* (2013.01)

(58) Field of Classification Search
CPC ........... C12Q 1/6883; C12Q 2600/106; C12Q 2600/156; G06T 3/005; G06T 3/4038; H04N 1/3876
USPC ...................... 358/450–498, 540; 714/47, 39; 382/284, 100, 268, 154; 348/222.1, 77, 348/85, 220.1
See application file for complete search history.

(56) References Cited

U.S. PATENT DOCUMENTS

| | | | |
|---|---|---|---|
| 5,262,867 A | 11/1993 | Kojima | |
| 6,097,854 A | 8/2000 | Szeliski et al. | |
| 6,389,179 B1 * | 5/2002 | Katayama et al. | 382/284 |
| 6,714,249 B2 | 3/2004 | May et al. | |
| 6,717,608 B1 | 4/2004 | Mancuso et al. | |
| 6,912,293 B1 * | 6/2005 | Korobkin | 382/100 |
| 7,234,137 B2 * | 6/2007 | Taylor et al. | 717/167 |
| 7,308,131 B2 * | 12/2007 | Lelescu et al. | 382/154 |
| 7,324,137 B2 * | 1/2008 | Akizuki et al. | 348/221.1 |
| 2003/0002750 A1 * | 1/2003 | Ejiri et al. | 382/284 |
| 2003/0048357 A1 * | 3/2003 | Kain et al. | 348/144 |
| 2004/0257441 A1 * | 12/2004 | Pevear et al. | 348/144 |

OTHER PUBLICATIONS

Szeliski et al., "Creating Full View Panoramic Image Mosaics and Texture-mapped Models," 1997, SIGGRAPH, pp. 251-258.
Shum et al., "Construction and Refinement of Panoramic Mosaics with Global and Local Alignment," 1998, ICCV, pp. 953-958.
Peleg et al., "Mosaicing on Adaptive Manifolds," Oct. 2000, PAMI, pp. 1141-1154.
Roussa et al., "Universal Mosaicing with Pipe Projection," 1998, ICCV, pp. 945-952.
Roussa et al., "Mosaicing with Generalized Strips," May 1997, DARPA Image Understanding Wrokshop, pp. 255-260.

(Continued)

*Primary Examiner* — Benny Q Tieu
*Assistant Examiner* — Quyen V Ngo
(74) *Attorney, Agent, or Firm* — Roxanna Yang

(57) ABSTRACT

An exemplary method for creating a composite image includes the steps of capturing a plurality of images with an image capture device which includes a sensor, determining an image capture device pose corresponding to each of the images based on data from the sensor, transforming each of the images based on its corresponding pose, projecting the transformed images to a common projection space, and combining the projected images to form a composite image.

26 Claims, 9 Drawing Sheets

(56) References Cited

OTHER PUBLICATIONS

Peleg et al., "Panoramic Mosaics with VideoBrush," May 1997, DARPA Image Understanding Workshop, pp. 261-264.
Peleg et al., "Panoramic Mosaics by Manifold Projection," Jun. 1997, IEEE Conf. on Computer Vision and Pattern Recognition (CVPR), pp. 338-343.
Mann et al., "Painting with Looks: Photographic Images from Video Using Quantimetric Processing," 2002, ACM Multimedia.
Sawyhney et al., "Compact Representation of Video through Dominant and Multiple Motion Estimation," Aug. 1997, PAMI, pp. 814-830.
Capel et al., "Automated Mosaicing with Super-resolution Zoom," Jun. 1998, Proc. of CVPR, pp. 885-891.
Aggarwal et al., "High Dynamic Range Panoramic Imaging," 2001, IEEE, pp. 2-9.
http://mathworld.wolfram.com/EulerAngles.html.
DeCouto, "Instrumentation for Rapidly Acquiring Pose-Imagery," Jun. 1998, Ph.D Thesis at MIT.

* cited by examiner

Yaw – top view

Pitch – left view

Roll – back view

Side view of xz and uw plane

Top view of xy plane

Top view

Side view along ray OP

CREATING COMPOSITE IMAGES BASED ON IMAGE CAPTURE DEVICE POSES CORRESPONDING TO CAPTURED IMAGES

BACKGROUND

A composite image is generally created by combining a series of overlapping images, thus representing a scene having a larger horizontal and/or vertical field of view than a standard image. For example, a series of individual images captured by an image capture device can be combined to form a panoramic image of the skyline, of the horizon, or of a tall building.

In order to properly combine (or stitch together) the individual images, the overlapping features at the edges of the images must be matched. Matching techniques range from the relatively simple to the relatively sophisticated. An example of the former includes manually aligning a series of images in a two-dimensional space until the edges are considered properly lined up, as interpreted by the naked eye.

A more sophisticated technique uses computer-implemented stitching software to calculate a best fit between adjacent images. Stitching software is widely commercially available. The best fit can be calculated in a variety of ways. For example, pattern detection can be used to match image features, either automatically (e.g., without manual intervention) or quasi-automatically (e.g., first manually aligning the images to provide a coarse fit, then refining the fit by computer).

In general, determining the positions of best fit can be challenging because when a three-dimensional scene (i.e., the overall scene being photographed) is mapped to multiple two-dimensional planes (i.e., the collection of individual images), pixels in different images may no longer match in the two-dimensional planes. That is, image features may be stretched, shrunken, rotated, or otherwise distorted from one image to another.

Such distortions often arise because of differences in the poses (or orientations) of the image capture device from shot to shot. For example, two images captured side by side may not be exactly aligned, with one being incrementally pitched (e.g., due to the photographer leaning forward or backward) relative to the other. Or, one image may be incrementally rolled (e.g., due to the photographer leaning to the left or right) relative to the other. Or, one image may be incrementally yawed (e.g., due to the photographer panning the image capture device horizontally) relative to the other. More generally, the pose of the image capture device can vary from shot to shot due to a combination of such pitching, rolling and/or yawing.

In light of the foregoing, a market exists for a technology to determine the pose (e.g., expressed in pitch, roll, and/or yaw terms or otherwise) of an image capture device when capturing an image to facilitate generation of composite images.

SUMMARY

An exemplary method for creating a composite image includes the steps of capturing a plurality of images with an image capture device including a sensor, determining an image capture device pose corresponding to each of the captured images based on data from the sensor, transforming each of the images based on its corresponding pose, projecting the transformed images to a common projection space, and combining the projected images to form a composite image.

An exemplary optical imaging array for capturing a plurality of images at different poses, the plurality of images being combinable into a composite image, includes an optical imaging array configured to capture a plurality of digital images, each image being representable in a fixed coordinate system, a sensor configured to obtain a plurality of poses of the optical imaging array, each pose corresponding to a respective one of the images, and an interface for outputting the pose to an image manipulation system configured to transform each image based on each corresponding pose, project the transformed images to a common projection space, and combine the projected images to form a composite image.

Other exemplary aspects and embodiments are also disclosed.

DETAILED DESCRIPTION

I. Overview

Section II describes an exemplary process for creating a composite image.

Section III describes an exemplary convention for characterizing the pose of the image capture device in terms of yaw, pitch and roll angles, and an exemplary process for determining the angles from use of sensors attached to the image capture device.

Section IV describes an exemplary process for transforming an image to account for the effect of pose changes.

Section V describes an exemplary process for projecting an image onto an exemplary cylindrical projection space, stitching together all the images, and unwrapping the cylinder to form a planar image.

Section VI describes an exemplary embodiment wherein multiple image capture devices are connected to each other.

Section VII describes additional aspects, implementations, and embodiments.

Section VIII describes exemplary computing environments.

II. Creating a Composite Image

Figure 1:
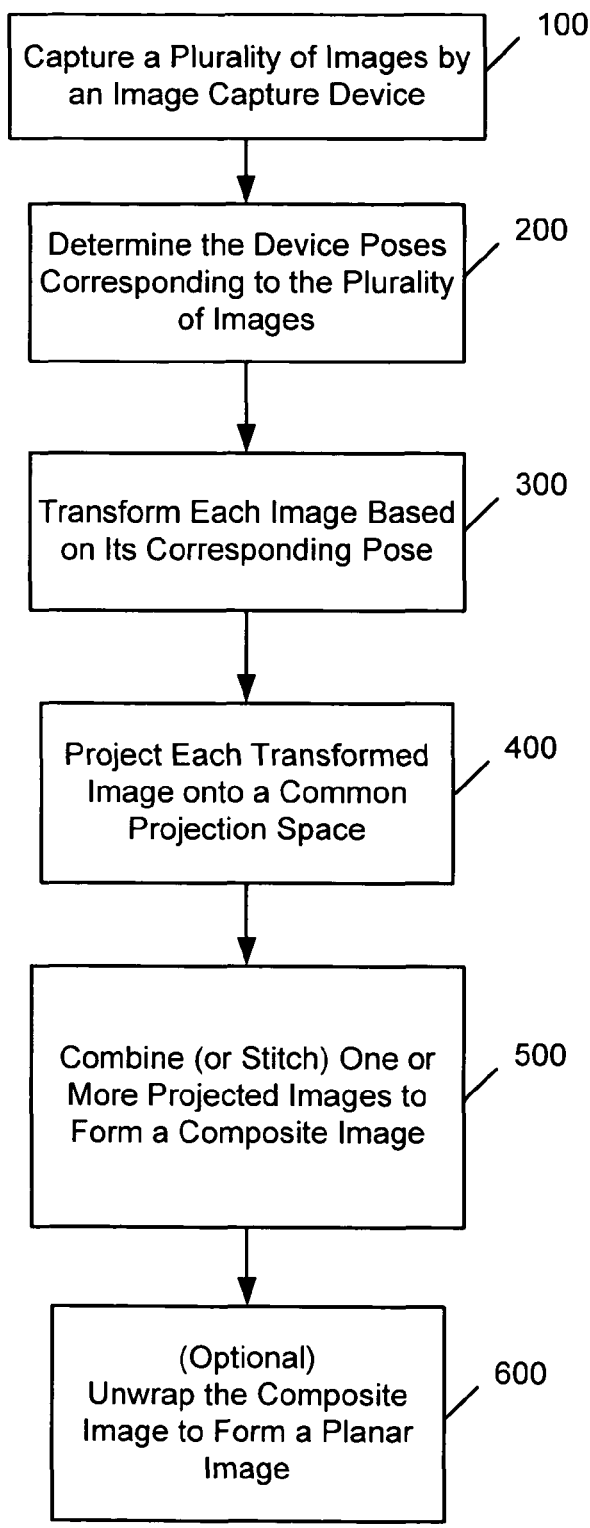
FIG. 1 illustrates an exemplary process for creating a composite image.

FIG. 1 illustrates an exemplary process for creating a composite (e.g., panoramic) image.

At step 100, a plurality of images is captured by an image capture device. The image capture device could be a camera, an optical image array (e.g., a scanner), a text-reading stylus (e.g., as used in computerized pen translators), a lens and imaging array, or any other device having image capturing capabilities, such as a camera-equipped cellular phone, PDA, etc. Thus, the term "image capture device" should be interpreted broadly to include any such imaging device.

At step 200, the image capture device pose corresponding to each captured image is determined. In an exemplary implementation, the image capture device pose is determined based on sensor measurements. This will be described in greater detail in Section III.

At step 300, each captured image is transformed to account for the changes in image capture device pose relative to other images. In an exemplary implementation, an image is backward projected to account for such changes. This will be described in greater detail in Section IV.

At step 400, each transformed image is projected onto a common projection space. This will be described in greater detail in Section V.

At step 500, the projected images are combined or stitched together to form a composite image having substantial continuity across adjacent images. This also will be described in greater detail in Section V.

At step 600, the composite image is optionally unwrapped to form a planar image. This also will be described in greater detail in Section V.

III. Determining the Pose of the Image Capture Device

At step 200 of FIG. 1, the pose of the image capture device upon capturing an image is determined based on sensor measurements relative to a fixed coordinate system (e.g., an image capture device-fixed coordinate system).

A. An Exemplary Convention for Characterizing the Pose

Exemplary image capture device-fixed coordinates may be given by uvw: the positive u-axis extends outward from the image capture device lens; the positive v-axis extends leftward from the image capture device body; and the positive w-axis extends upward perpendicular to u and v.

The uvw axes are centered at the image capture device's optical nodal point, which is the point where all the light rays passing through the image capture device's lens appear to converge. Images are acquired by the image capture device at its imaging plane (e.g., at a CCD array in the case of a digital image capture device), which is located a distance d f from the origin. The distance d f is equal to the focal length of the lens. In an exemplary embodiment, any point in an image captured by the image capture device will have (u,v) coordinates that may be expressed in pixel units across the imaging plane.

Figure 2A:
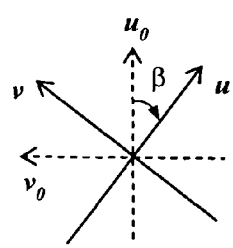
FIGS. 2A-2C illustrate an exemplary convention for yaw, pitch and roll of an image capture device when capturing an image.
Figure 2B:
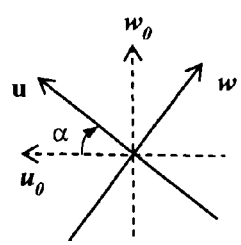
Figure 2C:
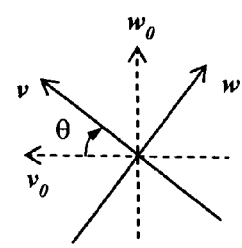

The uvw axes change from image to image, as the pose of the image capture device is changed. As shown in FIGS. 2A-2C, at any given instant (e.g., when an image is acquired), the uvw axes may be characterized by a yaw angle $\beta$, a pitch angle $\alpha$, and a roll angle $\theta$, relative to the initial positions of the uvw axes $u_0$, $v_0$, $w_0$. In an exemplary implementation, the initial positions of the uvw axes coincide with the world coordinates xyz (which do not change over time). That is, the angular orientations of the image capture device may be characterized by its yaw, pitch and roll relative to the fixed world coordinates.

B. Determining the Pose from Sensors Attached to the Image Capture Device

This section describes the use of sensors to determine the pose of the image capture device in terms of its instantaneous yaw, pitch and roll angles.

One or more acceleration sensors (or accelerometers) can be embedded in (or otherwise attached to) an image capture device to determine the instantaneous acceleration experienced by the image capture device. For example, accelerometers might be deployed along each of the image capture device's u and v axes to determine the respective accelerations in the u and v directions. Such accelerometers are widely commercially available (e.g., from companies such as Analog Devices and need not be described in detail herein.

In an exemplary embodiment, the sensors are placed at the center of gravity of the image capture device. Provided that the image capture device is stationary when an image is captured, it is known that the net acceleration experienced by the image capture device will be a vertically downward gravitation acceleration of 1 G. The same is true when the image capture device is moving at a steady velocity, e.g., when shooting out the window of a car traveling straight ahead at a steady speed. Either way—zero (or constant) velocity—means the image capture device is not accelerating. This is usually a good approximation for the majority of image-capturing used to create composite images because one typically is not moving the image capture device around while capturing images. Instead, one typically holds the image capture device steady to capture an image, then moves the image capture device, holds it steady again, captures another image, and so forth.

Figure 3:
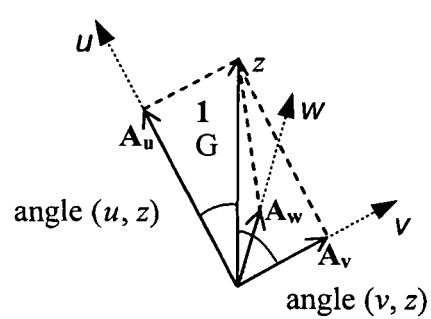
FIG. 3 illustrates decomposing the acceleration experienced by a sensor-equipped image capture device into image capture device-fixed coordinates.

FIG. 3 illustrates decomposing the 1 G acceleration experienced by a sensor-equipped, non-accelerating image capture device into image capture device-fixed coordinates. The acceleration vector will have components $A_u$, $A_v$ and $A_w$ in the u, v and w coordinates, respectively. It follows that $$A_u = 1 \cdot \cos(\text{angle}(u, z))$$

and $$A_v = 1 \cdot \cos(\text{angle}(v, z)).$$

Hence, $$\text{angle}(u, z) = \arccos(A_u)$$

and $$\text{angle}(v, z) = \arccos(A_v)$$

where $A_u$ and $A_v$ are known from the accelerometer measurements. Referring back to FIG. 2, $$\text{angle}(u, z) = 90 - \alpha$$

and $$\text{angle}(v, z) = 90 - \theta.$$

Hence, the pitch can be computed as $$\alpha = 90 - \arccos(A_u)$$

and the roll as $$\theta = 90 - \arccos(A_v).$$

The remaining unknown pose angle is the yaw, $\beta$, which is the angle between the x and u axes. It is generally not possible to determine this angle from the accelerometers alone because the last remaining component of the acceleration vector, $$A_w = 1 \cdot \cos(\text{angle}(w, z)),$$

relates to the z and w axes, not the x and u axes. However, the yaw may be determined using other known types of yaw rate sensors, such as those which are becoming widely deployed in automobiles for sensing tire skidding (e.g., so-called fishtailing) and engaging differential braking and other stability control systems. For example, some such yaw sensors are constructed as polysilicon and/or MEMS devices, and operate by determining the angular acceleration rate about a vertical axis, then integrating that rate over a short interval. These and other types of yaw sensors are commercially available from companies such as BEI Technologies, Robert Bosch, and others, and need not be described in detail herein.

The foregoing assumes that the image capture device is not accelerating during image capture. In the case in which the image capture device is accelerating, another type of sensor known as a gyro can be used in conjunction with the accelerometers to determine the pose angles. An accelerometer measures the acceleration, while a gyro measures the rate of change of acceleration. Having such additional information allows one to account for the fact that the net acceleration vector on the image capture device is no longer just due to gravity, but also has a contribution due to the additional (non-gravitational) acceleration of the image capture device.

The foregoing also assumes that the sensors are placed along the image capture device-fixed coordinates (i.e., along the u, v and w axes) while capturing the images. If the sensors are placed along other axes, as long as the sensor axes are still fixed to (and thus move with) the image capture device, sensor measurements along those axes can be converted to measurements along the image capture device axes using the appropriate coordinate transformation (or, equivalently, a rotation matrix). Such coordinate transformations and rotation matrices are well known in the art, and need not be described in detail here.

Further, the sensors described above are merely exemplary. One skilled in the art will recognize that, depending on design choice, one or more other sensors may also be implemented. For example, one or more of the following sensors may be used individually, or in combination with one or more sensors described above: inclinometer, angular rate sensor, compass, optical flow sensor, and/or computation based on detection of ground plane or other objects using sonar, radar, lidar navigation beacons such as VOR, VORTAC, VORDME, TACAN, GPS, cellphone towers, Astral, Solar, Lunar, and/or other navigation systems.

IV. Transforming an Image to Account for the Effect of Pose Changes

Returning now to FIG. 1 at step 300, after having determined the pitch, roll and/or yaw associated with the pose of the image capture device for any given image, the image can then be transformed to account for the changes in pose relative to other images. In an exemplary implementation, the images are transformed by backward projection.

A. Accounting for Roll

Figure 4:
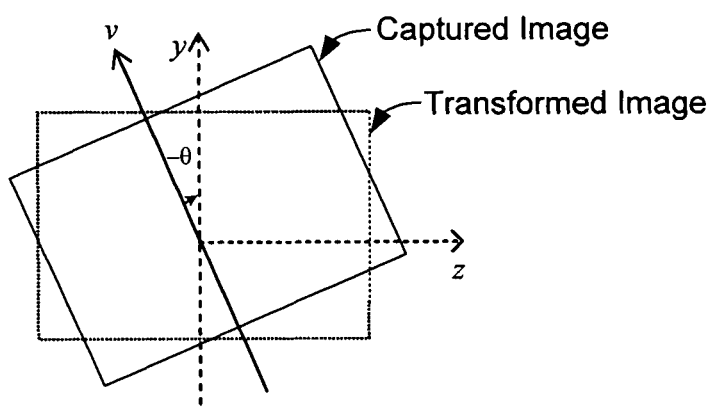
FIG. 4 illustrates backward projecting an image to account for roll.

FIG. 4 illustrates an exemplary transformation to account for the roll (about the x axis) by rotating the image through the roll angle θ in the opposite direction, i.e., bringing the vw axes back into alignment with the yz axes. Accounting for roll is the simplest to implement since the image itself occurs in the vw plane. Any point $(P_v', P_w')$ in the image as captured can be transformed to a new point $(P_y, P_z)$ in the image as compensated by the following equations representing rotation through an angle (−θ):

$$P_y = \cos(-\theta) \cdot P_v' + \sin(-\theta) \cdot P_w'$$

$$P_z = -\sin(-\theta) \cdot P_v' + \cos(-\theta) \cdot P_w'.$$

The x-component is unchanged, since the roll occurred about the x-axis:

$$P_x = P_u'$$

and is in any event equal to the focal length f, which is the distance from the imaging plane to the nodal point B. Accounting for Pitch FIGS. 5A and 5B illustrate an exemplary transformation to account for pitch (in the xz or uw plane) by rotating the image through the pitch angle α in the opposite direction.

For simplicity of discussion, this figure and the discussion below assumes that the only change of pose is due to pitching (i.e., the y and v axes are coincident with each other). Those skilled in the art will readily appreciate how to adapt the following discussion to the more general case where the change of pose includes other effects besides pure pitching. We choose not to illustrate the more generalized case, because its added geometric complexity (although the transformations are still straightforward) is likely to obscure (rather than illuminate) the basic process of pitch compensation.

Figure 5A:
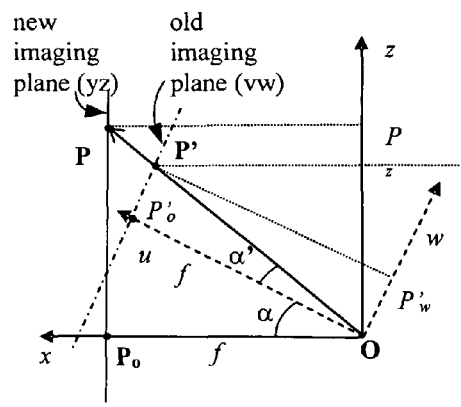
FIGS. 5A and 5B illustrate backward projecting an image to account for pitch.
Figure 5B:
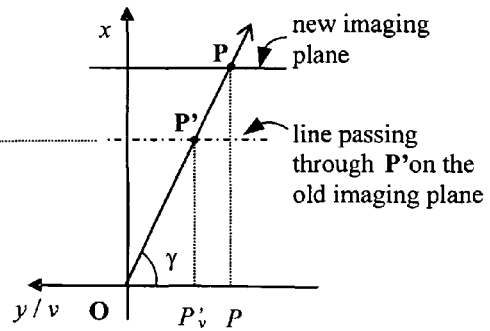

FIG. 5A illustrates rotating the uw axes (dashed lines) backward through an angle α to the xz axes (solid lines). In this view, the image (which lies in the uw plane) is represented as a dotted-dashed line parallel to the w axis (labeled the "old imaging plane"), and is to be rotated to the solid vertical line parallel to the z axis (labeled the "new imaging plane"). Point O, the origin of both the uw and xz axes, is the optical nodal point of the image capture device.

Any point P' on the old imaging plane (i.e., on the image as captured) is mapped to a new point P on the new imaging plane (i.e., the image as pitch-corrected). The coordinates of P'—which are known—are $(P_u', P_w')$, where $P_u'$ is equal to the focal length f since it is the distance from the old imaging plane to the nodal point. The coordinates of P—which is to be computed—are $(P_x, P_z)$, where $P_x$ is also equal to the focal length f since it is also the distance from the new imaging plane to the nodal point.

The point labeled $P_O'$ is the center of the old imaging plane, where the u axis intersects it. The point labeled $P_O$ is the center of the new imaging plane, where the x axis intersects it.

The angle denoted by α' is the angle between the u axis and the vector OP.

From the geometry of the figure, $$\tan \alpha' = P_w'/f$$

and $$\tan(\alpha' + \alpha) = P_z/f$$

from which $P_z$ can be calculated as a function of $P_w'$:

$$P_z = f \tan(\arctan(P_w'/f) + \alpha).$$

FIG. 5B illustrates the same rotation of a point P' (in the old imaging plane) to P (in the new imaging plane) from the vantage point of the xy axes. Note that the y axis is the same as the v axis because (in this exemplary illustration) the change in pose arose only from rotation about the y axis.

The v-coordinate of P' is $P_v'$ (which is known), and the y-coordinate of P is $P_y$ (which is to be computed). The angle denoted by γ is the angle between the γ axis and the vector OP' (or OP).

From the geometry of the figure, $$\cos \gamma = P_v'/|P'|$$

where $|P'| = \sqrt{P_x^2 + P_y'^2 + P_z'^2}$ is the (known) magnitude of the vector OP'. Similarly, $$\cos \gamma = P_y/|P|$$

Combining the last two equations gives $$P_y = P_v'|P|/|P'|$$

or, since $|P| = \sqrt{P_x^2 + P_y^2 + P_z^2}$, $$P_y = P_v' \sqrt{P_x^2 + P_y^2 + P_z^2} / \sqrt{P_x^2 + P_y'^2 + P_x'^2}.$$

All the primed quantities are known from the image as captured, $P_x$ is simply the focal length f, and $P_z$ is known from the discussion of FIG. 5A. Hence, $P_y$ can be calculated.

In the foregoing manner, each point P' in the image as captured can be transformed to a corresponding point $P=(P_x, P_y, P_z)$ in the pitch-corrected image.

C. Accounting for Yaw

In one exemplary implementation, the image as captured may also be transformed to account for yaw in a manner analogous to that given above for pitch transformation (assuming that yaw has been determined using a yaw rate sensor, for example, as disclosed in Section III.B above). The mathematics of such yaw correction will be readily apparent to one skilled in the art, and need not be described in detail herein as they are not particularly illustrative.

Furthermore, in another exemplary implementation, this particular type of yaw correction is skipped in favor of a translational matching form of yaw transformation that is particularly suitable when the images are projected onto a cylindrical projection space. This will be described in Section V.B below.

V. Projecting Images onto a Projection Space, Stitching the Images to Form a Composite Image, and Unwrapping the Projection to Form a Planar Image A. Projection onto a Common Projection Space Returning now to FIG. 1 at step 400, each of the individual transformed images (e.g., to account for one or more of roll, pitch, and yaw) is projected to a common projection space appropriate to the type of composite image being generated. For example, if the composite image is a panoramic view of the horizon, the photographer might have panned the image capture device from left to right while capturing a series of images. In one embodiment, this type of images is projected onto a common space characterized by the circumference of a vertical cylinder at an altitude approximately at the eye level of the photographer. Especially where the images are relatively distant from the image capture device, it is a good approximation to treat the individual images as varying from one another only in pose (i.e., without any translational differences). Mathematically, this is equivalent to assuming (or approximating) that the image capture device was rotated about its optical nodal point, so that the world axes xyz, and each of the instantaneous image capture device axes uvw, have the same common origin.

Figure 6:
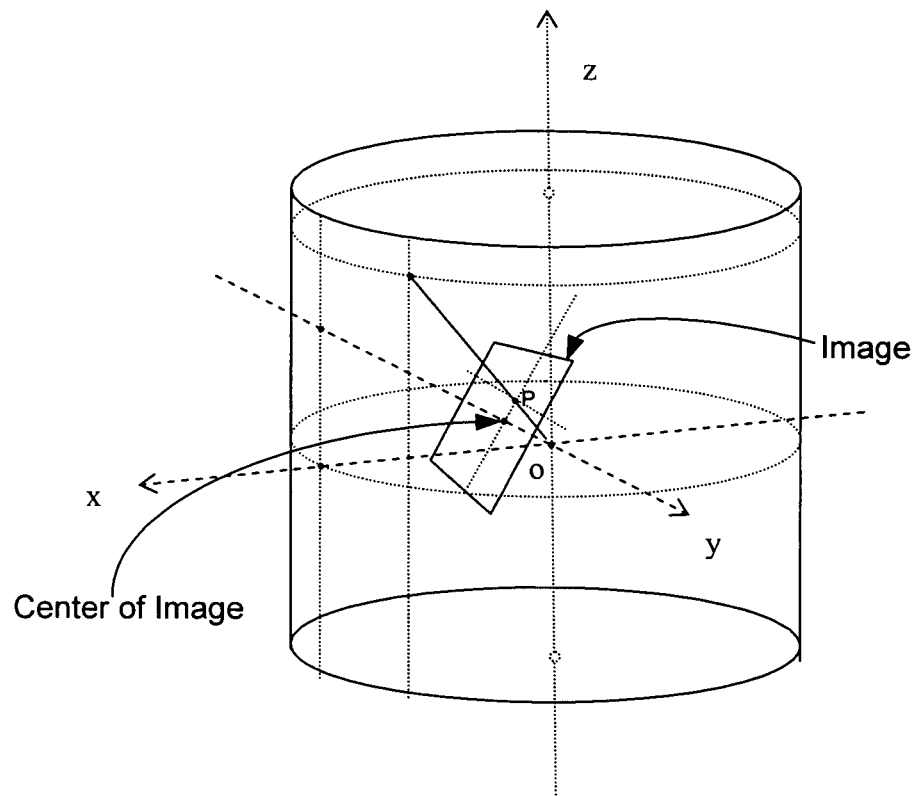
FIG. 6 illustrates the geometry of projecting an image onto a cylindrical projection space.
Figure 7A:
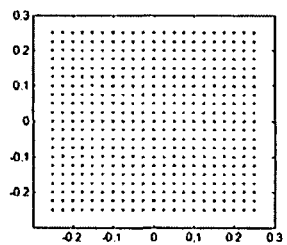
FIG. 7A illustrates an exemplary original image before mapping onto a cylindrical projection space.
Figure 7B:
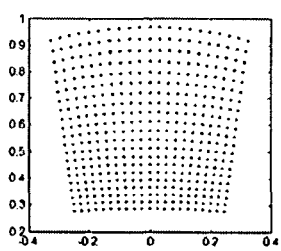
FIG. 7B illustrates an exemplary image after mapping onto a cylindrical projection space.

FIG. 6 schematically illustrates the projection of an individual image onto the cylinder surface. World axes x and y (denoted by dashed lines) pass thru common origin (or nodal point) O. An exemplary point P just above the center of the image is projected to the cylinder's surface by a ray (denoted by solid line) originating at nodal point O and passing through the exemplary point to the surface of the cylinder. Note that different points along the top edge of the image will be projected to different elevations on the cylinder. For example, a ray passing upward through a point at the upper corner of the image will intersect the cylinder at a lower elevation because the lateral extent of the image brings that corner closer to the cylinder. Conversely, a ray passing through the center of the upper edge of the image will intersect the cylinder at a higher elevation because the center of the upper edge is farthest from the cylinder. Thus, a rectangular image in image capture device-fixed coordinates (see FIG. 7A) will be deformed into a curved image (see FIG. 7B) when projected to the cylindrical projection space.

Figure 8A:
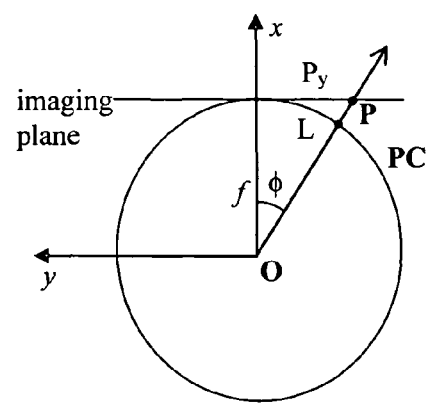
FIGS. 8A and 8B illustrate mapping a pose-corrected image to the cylindrical projection space.
Figure 8B:
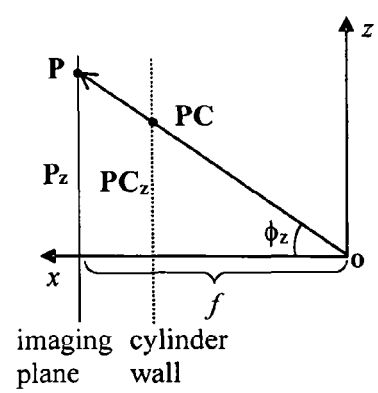

FIGS. 8A and 8B illustrate one implementation of mapping onto a cylindrical projection space.

FIG. 8A illustrates a top view. The cylinder is centered about the z axis. A point P in the transformed image (labeled "imaging plane" in the figure) is to be mapped to a point PC on the cylinder. Point P has coordinates $(P_x, P_y, P_z)$ which are known. Point PC has coordinates $(L, PC_z)$, which are to be calculated from $(P_x, P_y, P_z)$. L is the arc length along the circumference of the cylinder, and $PC_z$ is the elevation. The cylinder has radius f, equal to the focal length, since that is the distance from the imaging plane to the nodal point (at O).

From the figure, $$\tan \phi_y = P_y/f$$

and $$L = f\phi_y$$

so that $$L = f \arctan(P_y/f)$$

may be calculated.

FIG. 8B illustrates a side view along the ray OP. From the figure, $$\sin \phi_z = P_z/|P|$$

where $$|P| = sqrt(P_x^2 + P_y^2 + P_z^2)$$

and $$\tan \phi_z = PC_z/f.$$

Combining the last three equations gives $$PC_z = f \tan(\arcsin(P_z/sqrt(P_x^2+P_y^2+P_z^2))).$$

Thus, the coordinates of each point on the transformed image can be projected to the cylinder.

B. Combining the Images to Form a Composite Image

Figure 9:
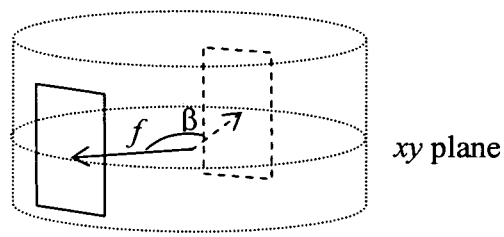
FIG. 9 illustrates backward projecting an image to account for yaw.

Returning now to FIG. 1 at step 500, after all the images are projected to the cylinder, they may be combined (or stitched) together to form a composite image. If a transformation to account for yaw is not performed at step 300 (see Section IV.C above), then the images will not be properly aligned about the circumference of the cylinder. In that case, one can use translational matching techniques to align the images. Basically, images are slid back and forth along the circumference until common features overlap at their vertical edges. This is illustrated schematically in FIG. 9. Such translational matching techniques are well known to those skilled in the art and need not be described in detail herein. For example and without limitation, these might include techniques for minimizing the sum of absolute differences (SAD) between overlapping pixels in an overlapping pair of images.

C. Unrolling the Cylindrical Image to a Planar Image

Finally, returning again to FIG. 1 at step 600, the composite image may be optionally unrolled to form a planar image to be printed on paper, viewed on a monitor, or otherwise displayed in a conventional two dimensional fashion.

VI. Relating Images Captured by a First Device to a Second Device Connected Thereto In one exemplary embodiment, two image capture devices might be connected to one another. In general, the relationship of the pose of the first device relative to the second device can be expressed as a combination of coordinate translations and/or rotations. As long as the relative relationship of the two devices does not change over a given interval of time, images acquired in the coordinate system of the first device, during that time interval, can be readily expressed in the coordinate system of the second device by application of appropriate translation and/or rotation operations (e.g., expressed as known translation and/or rotation matrices). The particulars of the translation and/or rotation operations are well known in the art, and need not be described in detail herein. In an exemplary implementation, these operations may be performed by a microprocessor within (or accessible to) the second image capture device. This may enable one to, for example, form a composite image of the second device without having a sensor in the second device or combine images from both devices into a composite image.

VII. Additional Aspects, Implementations and Embodiments

The foregoing exemplary embodiments were illustrated using the context of an image capture device acquiring a plurality of images (e.g., photographs) to be combined into a composite image. However, it will be appreciated that the techniques disclosed herein are widely applicable to any imaging device acquiring a plurality of images to be combined together.

Further, depending on design choice, the transformation of an image based on its associated image capture device pose (e.g., angular orientations) may be performed on the image capture device itself (e.g., by a microcontroller attached to the image capture device) or on a separate computing device (e.g., a PC) configured to communicate with the image capture device. For example, the image capture device may communicate to a separate computing device via an interface. In an exemplary implementation, the interface outputs the digital images and pose associated with each image to a computer-implemented application (e.g., an image manipulation system) which is configured to project each image to a common projection space, and combine the projected images to form a composite image having substantial continuity across adjacent images. Such a computer-implemented application may be implemented as software installed on the computing device. Depending on design choice, the computer-implemented application may also be installed on an image capture device having sufficient computing capabilities (e.g., an image capture device with a microcontroller and sufficient memory for executing the logic instructions of the software).

In addition, the common projection space is illustrated using the context of a cylinder. This is particularly appropriate for panoramic images sweeping across a horizon. However, other types of projection spaces (e.g., a sphere) may be appropriate for other types of composite images.

VIII. Exemplary Computer Environments

In an exemplary implementation, the techniques described herein can be implemented using any suitable computing environment. The computing environment could take the form of software-based logic instructions stored in one or more computer-readable memories (or, equivalently, media) and executed using a computer processor. Alternatively, some or all of the techniques could be implemented in hardware, perhaps even eliminating the need for a separate processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

IX. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements thereof. Such identifiers are merely provided for convenience in reading, and should not necessarily be construed as requiring or implying a particular order of steps, or a particular sequential relationship among the claim elements.

What is claimed is:

1. A method for creating a composite image based on a plurality of images captured at different poses, comprising:
   capturing a plurality of images with a single image capture device from a substantially stationary location, said image capture device including a sensor to obtain a magnitude and a direction of corresponding instantaneous acceleration forces acting on said image capture device upon capturing each of said images from the substantially stationary location;
   determining a pose of said image capture device corresponding to each of said images captured from the substantially stationary location based on acceleration data corresponding to said instantaneous acceleration forces from said sensor;
   transforming each of said captured images based on a corresponding pose of said image capture device to account for changes in pose of said image capture device for each of said captured images;
   projecting said transformed images to a common projection space; and
   combining said projected images to form a composite image.

2. The method of claim 1, wherein said common projection space is a sphere.

3. The method of claim 1, wherein said common projection space is a cylinder.

4. The method of claim 1, further comprising projecting said composite image from said common projection space into a desired viewing plane.

5. The method of claim 1, wherein said pose of said image capture device includes angular orientations of said image capture device.

6. The method of claim 5, wherein said angular orientations include one or more of roll, pitch and yaw.

7. The method of claim 6, wherein said transforming each of said captured images includes rotating a corresponding image in an opposite direction of said roll.

8. The method of claim 6, wherein said transforming each of said captured images includes rotating a corresponding image in an opposite direction of said pitch.

9. The method of claim 1, wherein said combining said projected images to form a composite image includes making translational adjustments for improved matching of corresponding features of overlapping images.

10. The method of claim 1, wherein said sensor includes an accelerometer for measuring the gravitational acceleration vector acting on the image capture device, and said pose of said image capture device is determined by resolving said gravitational acceleration vector into its components in an image capture device-fixed coordinate system.

11. The method of claim 10, wherein said sensor includes a gyroscopic sensor for measuring a change of acceleration of the image capture device.

12. A system for creating a composite image based on a plurality of images captured at different poses, comprising:
- a single image capture device configured to capture a plurality of digital images from a substantially stationary location;
- a sensor configured to obtain a magnitude and a direction of instantaneous acceleration forces acting on said image capture device for a plurality of poses of said image capture device, changes in pose of said image capture device determined from acceleration data corresponding to said instantaneous acceleration forces, and each of said poses corresponding to a respective one of said images captured from the substantially stationary location;
- a computer-readable medium containing logic instructions for using a corresponding pose of said image capture device for each of said captured images to transform each of said captured images based on changes in pose of said image capture device between said captured images;
- a computer-readable medium containing logic instructions for projecting said transformed images to a common projection space; and
- a computer-readable medium containing logic instructions for combining said projected images to form a composite image.

13. The system of claim 12, further comprising a computer-readable medium containing logic instructions for projecting said composite image from said common projection space into a desired viewing plane.

14. The system of claim 12, wherein said poses include angular orientations of said image capture device.

15. The system of claim 12, wherein said sensor includes an accelerometer for measuring the gravitational acceleration vector acting on the image capture device, and said poses are determined by resolving said gravitational acceleration vector into its components in said fixed coordinate system.

16. An individual image capture device for capturing a plurality of images at different poses, said plurality of images being combinable into a composite image, the individual image capture device comprising:
- an optical imaging array configured to capture a plurality of digital images from a substantially stationary location, each image being representable in a fixed coordinate system;
- a sensor configured to obtain a magnitude and a direction of a corresponding instantaneous acceleration force acting on the image capture device for each of a plurality of poses of said optical imaging array of the image capture device, each said pose determined based on acceleration data of said corresponding instantaneous acceleration force and corresponding to a respective one of said images captured from the substantially stationary location;
- an interface for outputting said poses to an image manipulation system configured to transform each of said captured images based on a corresponding pose of said optical imaging array of the image capture device to account for changes in pose of the image capture device between said captured images, project said transformed images to a common projection space, and combine said projected images to form a composite image.

17. The individual image capture device of claim 16 where said poses include angular orientations of said optical imaging array.

18. The individual image capture device of claim 17 where said sensor includes an accelerometer for measuring the gravitational acceleration vector acting on the image capture device, and said poses are determined by resolving said gravitational acceleration vector into its components in said image capture device-fixed coordinate system.

19. A non-transitory computer-readable medium containing a computer-implemented application for creating a composite image based on a plurality of images captured at different poses, comprising:
- computer-implemented logic instructions that, when executed on a processor, receive a plurality of digital images captured by a single image capture device from a substantially stationary location and receive a plurality of corresponding poses of said image capture device for said images measured by a sensor attached to said image capture device, said sensor to obtain a magnitude and a direction of corresponding instantaneous acceleration forces acting on said image capture device upon capturing each of said images, and said poses of said image capture device determined based on acceleration data corresponding to said instantaneous acceleration forces;
- computer-implemented logic instructions that, when executed on a processor, transform said captured images based on changes in pose of said image capture device between said captured images and project said transformed images to a common projection space; and
- computer-implemented logic instructions that, when executed on a processor, combine said projected images into a composite image.

20. The non-transitory computer-readable medium of claim 19 further comprising computer-implemented logic instructions that, when executed on a processor, project said composite image from said common projection space into a desired viewing plane.

21. The non-transitory computer-readable medium of claim 19 where said sensor includes an accelerometer for measuring the gravitational acceleration vector acting on the image capture device, and said poses are determined by resolving said gravitational acceleration vector into its components in a image capture device-fixed coordinate system.

22. A method for generating a composite image, comprising:
- determining first and second sets of multi-dimensional angular orientations of a single image capture device from a sensor attached thereto, said first and second sets of angular orientations corresponding to first and second images, respectively, captured by said image capture device from a substantially stationary location, said sensor to obtain first and second magnitudes and first and second directions of first and second instantaneous acceleration forces, respectively, acting on said image capture device upon acquiring said first and second images, and said first and second sets of angular orientations determined based on acceleration data corresponding to said first and second instantaneous acceleration forces from said sensor;
- transforming said first and second captured images based on said first and second sets of angular orientations, respectively, into first and second transformed images, respectively, to account for changes in pose of said image capture device between said first and second captured images;

projecting said first and second transformed images to a projection space; and enabling stitching of said first and second transformed images to generate a composite image.

23. The method of claim 22 where said projecting includes a first projection of said first and second transformed images to a curved projection space and a second projection of said first and second transformed images to a substantially flat viewing plane for display.

24. The method of claim 22 where said determining said first and second sets of angular orientations from a sensor includes measuring the gravitational acceleration vector acting on the image capture device, and resolving said vector into its components along the axes of said image capture device for each of said first and second images.

25. A system for creating a composite image, comprising:
an individual image capture device to acquire first and second images from a substantially stationary location;
one or more sensors to obtain a first magnitude and a first direction of a first instantaneous acceleration force acting on said image capture device upon acquiring said first image from the substantially stationary location and obtain a second magnitude and a second direction of a second instantaneous acceleration force acting on said image capture device upon acquiring said second image from the substantially stationary location; and
a microcontroller to:
receive acceleration data corresponding to said first and second instantaneous acceleration forces from said sensor;
determine first and second angular positions of said image capture device corresponding to said first and second acquired images, respectively, based on said acceleration data; and
transform said first and second acquired images based on said first and second angular positions of said image capture device to account for changes in pose of said image capture device between said first and second acquired images and enable stitching of said first and second transformed images to create said composite image.

26. A system for transforming a plurality of images captured at different poses into a composite image, comprising:

means for capturing a plurality of digital images by a single image capture device from a substantially stationary location, each image being representable in a fixed coordinate system;

means for obtaining a magnitude and a direction of a corresponding instantaneous acceleration force acting on said image capture device for each of a plurality of poses of said image capture device, each said pose determined based on acceleration data of said corresponding instantaneous acceleration force and corresponding to a respective one of said images captured from the substantially stationary location;

means for using said poses of said image capture device to transform each of said captured images to account for changes in pose of said image capture device for each of said captured images;

means for projecting said transformed images to a common projection space; and means for combining said projected images to form a composite image.

* * * * *

UNITED STATES PATENT AND TRADEMARK OFFICE
CERTIFICATE OF CORRECTION

PATENT NO. : 9,049,396 B2  
APPLICATION NO. : 10/954112  
DATED : June 2, 2015  
INVENTOR(S) : D. Amnon Silverstein et al.

Page 1 of 1

It is certified that error appears in the above-identified patent and that said Letters Patent is hereby corrected as shown below:

In the Claims  
In column 12, line 4, in Claim 18, delete "17" and insert -- 16 --, therefor.

Signed and Sealed this  
Eighth Day of December, 2015

Michelle K. Lee  
*Director of the United States Patent and Trademark Office*